2 Sheets--Sheet 2.

J. J. GREGORY.
Hay-Loaders.

No. 153,069.  Patented July 14, 1874.

Witnesses.  Inventor.
Leander Gorton  John J Gregory
F. Vanderhoof

UNITED STATES PATENT OFFICE.

JOHN J. GREGORY, OF BELMONT, NEW YORK.

IMPROVEMENT IN HAY-LOADERS.

Specification forming part of Letters Patent No. 153,069, dated July 14, 1874; application filed March 24, 1873.

*To all whom it may concern:*

Be it known that I, JOHN J. GREGORY, of Belmont, in the county of Allegany and State of New York, have invented a new and Improved Hay-Loader; and I do hereby declare the following to be a full and exact description of the same, reference being had to the accompanying drawings, forming part of this specification, in which—

Figure 1:
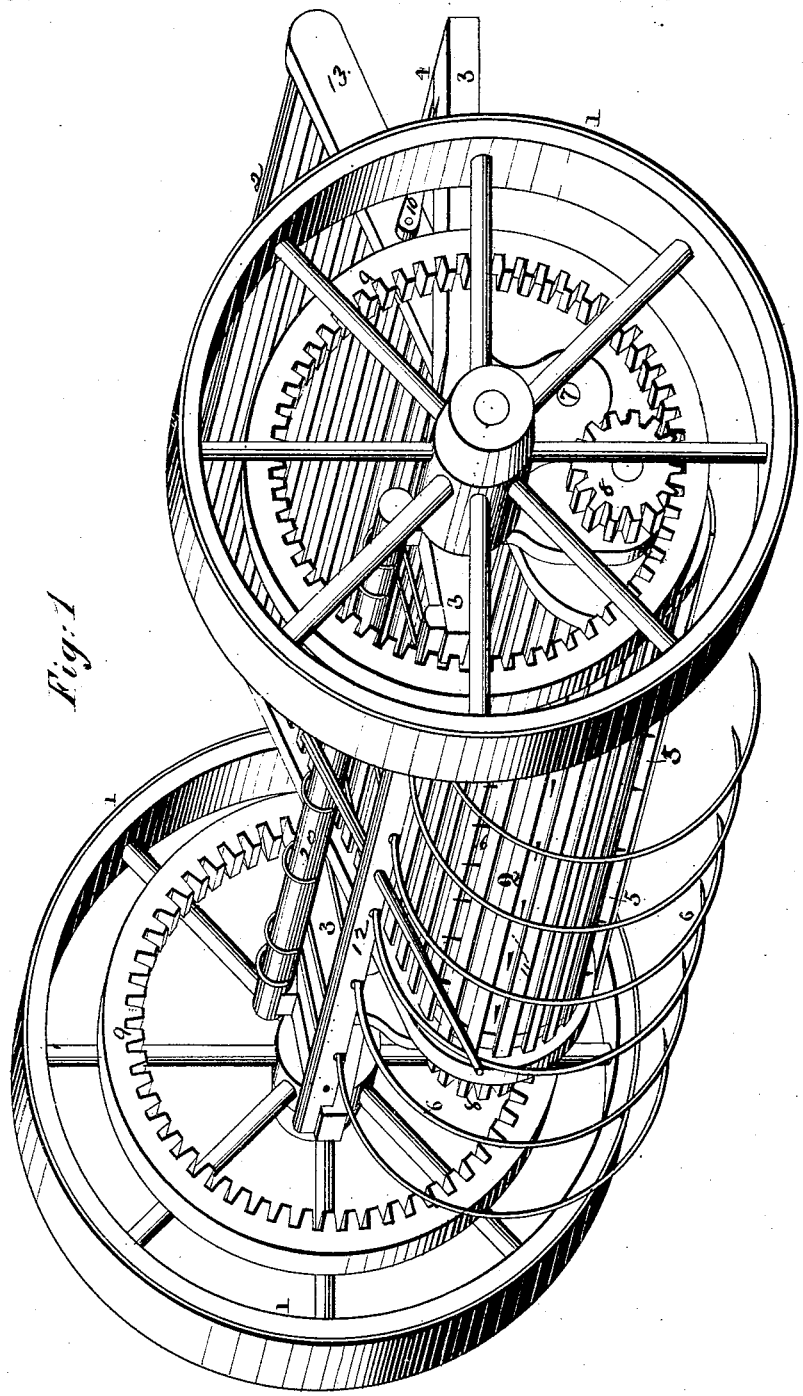
Figure 2:
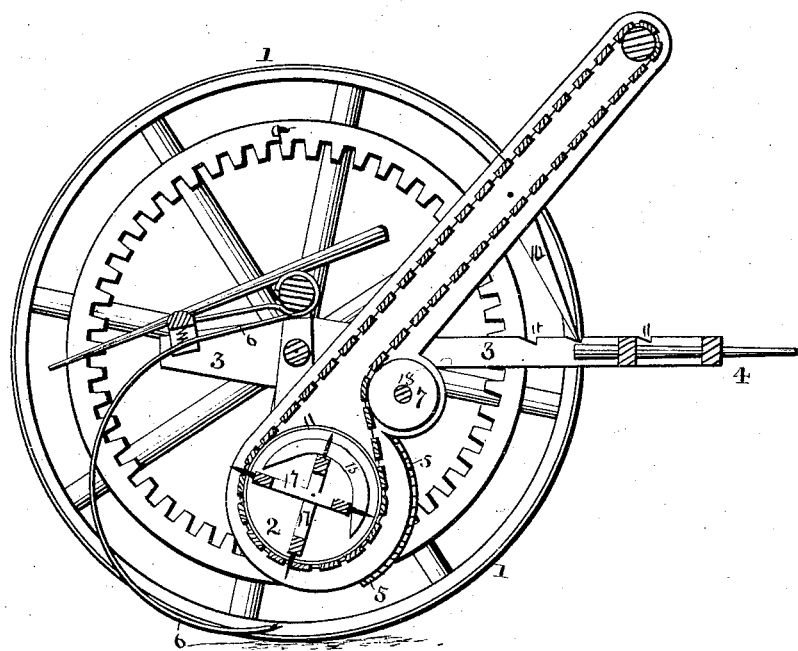

Figure 1 is a perspective view of my improved hay-loader, and Fig. 2 is a longitudinal section of the same.

Similar letters of reference in the accompanying drawings denote the same parts.

My invention relates to improvements in hay-loaders; and consists in the employment of an endless slatted apron, passing over a drum in front of the rake-tines, the former being provided with teeth, which are eccentrically operated to retract within the drum as they begin to descend or leave the spaces between the slats of the platform, to prevent carrying a portion of the hay through the slats, the endless apron surrounding the drum also assisting, in connection with the teeth on the drum, in raising the hay from the ground, conveying it to the wagon, to the rear end of which the hay-loader is attached.

In the accompanying drawing, 1 1 are the driving-wheels, to the spokes of which are attached the wheels 9 9, provided with cog-gearing on their inner surfaces. 8 8 are pinions on the axis of the drum 11, which mesh with the cog-gearings on the wheels 9 9, and give rotary motion to the drum 11 in the forward motion of the hay-loader. The axes of the drum 11 are journaled in hangers pivoted to the axes of the hubs of the driving-wheels, the upper ends of said hangers being connected by a transverse rake-head, 20, to which the curved rake-tines 6 6 are securely fastened. 13 is a frame, pivoted to the axes of the drum, capable of being elevated or depressed by means of the levers 10 entering grooves in the frame. 2 is an endless slatted platform passing around the drum 11 and a horizontal roller situated at the front of the frame 13. The slats of the platform are connected together by endless chains. 7 7 (see Fig. 2) are pulleys working loosely on the shaft 18, the latter being fixed and attached to ears depending from the frame of the slotted platform. The pulleys 7 7 are so formed as to form a seat or guide for the endless chains of the slatted platform in the movement of the latter; the pulleys 7 7 likewise serve as belt-tighteners as well as guides for the platform. 3 is a frame, pivoted to the axes of the hubs of the driving-wheels, and provided with a transverse bar, 4, to which is attached a short tongue, by means of which the hay-loader is attached to the hind end of a wagon. The transverse bar 12 connects the rear ends of the frame 3, and is provided with slots or guides for the rake-teeth. The drum 11 consists of two heads joined by horizontal arms through perforated plates, attached to which the teeth of the drum project in their normal position. The drum-teeth are attached to the arms in line with the radial arms 17 17, which cross each other at right angles, as seen in Fig. 2, and are operated, to retract the teeth when the latter begin to descend or leave the slot in the forward movement of the machine, by the eccentric 15, (see Fig. 2,) and are thrown out again when in their rotation they begin to ascend and carry the hay with them.

It is obvious that, by my construction, in which the slatted apron surrounds the drum, it will in its movement materially assist the drum-teeth in raising the hay to its upper horizontal surface. It also will be seen that, by retracting the drum-teeth when they begin to descend, and leave the spaces between the slats of the endless apron, I avoid pulling the hay through the spaces between the slats of the endless apron.

I claim as my invention—

The endless slatted apron 2, surrounding the drum, and loose pulleys 7 7, arranged on the under side of the endless apron, and provided with annular grooves, in which the endless chains of the slatted apron operate, in combination with the rake-tines 6 and drum 11, having teeth retracted by the cam 15, and carrying the endless slatted apron, the whole being arranged, constructed, and operated in the manner and for the purpose set forth.

JOHN J. GREGORY.

Witnesses:
LEANDER GORTON,
F. VANDERHOOF.